Sept. 10, 1963 DENZABURO TERAYAMA ET AL 3,103,192

SINGLE SHAFT COMPLEX DISC TYPE ROTARY THREAD TAKE-UP DEVICE

Filed March 20, 1957 3 Sheets-Sheet 1

Sept. 10, 1963 DENZABURO TERAYAMA ETAL 3,103,192

SINGLE SHAFT COMPLEX DISC TYPE ROTARY THREAD TAKE-UP DEVICE

Filed March 20, 1957 3 Sheets-Sheet 2

Sept. 10, 1963 DENZABURO TERAYAMA ETAL 3,103,192

SINGLE SHAFT COMPLEX DISC TYPE ROTARY THREAD TAKE-UP DEVICE

Filed March 20, 1957 3 Sheets-Sheet 3

3,103,192
Patented Sept. 10, 1963

3,103,192

SINGLE SHAFT COMPLEX DISC TYPE ROTARY THREAD TAKE-UP DEVICE

Denzaburo Terayama, 7 Fujimi-cho, Nakano-ku, and Toru Matsubara, 82 Kokuryo-cho, Chofu-shi, both of Tokyo, Japan Filed Mar. 20, 1957, Ser. No. 647,259
Claims priority, application Japan June 30, 1956
8 Claims. (Cl. 112—248)

This invention relates to an improvement in the single shaft complex disc type rotary thread take-up device which is adaptable to such an ultra-high speed rotation of a sewing machine as 4000–5000 r./m. more.

One object of this invention is to provide a device of the class described whereby a tension given to a sewing thread by a thread tension regulator under the above-mentioned ultra-high speed rotation is diminished remarkably.

Another object of this invention is to provide a device of the class described whereby a weak thread or an easily extensible thread, for example, nylon, is made adaptable to a sewing machine rotating at said ultra-high speed, which is considered to be difficult to use in such condition.

Still another object of this invention is to provide a device of the class described wherein all kinds of vibrations generated in a thread owing to the high speed operation of the rotary thread take-up device are collected at a thread tension regulator and absorbed by a thread take-up spring so as to cancel any vibration of the thread in the proximity of an eye of a needle.

Further another object of this invention is to provide a device of the class described whereby sewing operation is prevented from any trouble such as oscillation of the needle, stitch dropping, thread cutting, etc. owing to the vibration of thread running at a high speed.

Other and more specific objects of this invention will be apparent from the following description and claims.

We were granted an U.S. Patent No. 2,746,409 for an invention disclosing a sewing thread tension device in a sewing machine of the type in which a rotary hook makes two revolutions during a sewing cycle, comprising two discs concentrically attached to the main shaft of the machine, two pin-shaped sewing thread contact members fixed on said two discs, two thread guides, one on each side, set outside said discs, the angle formed by the center of rotation of said discs and the thread guides and the angle formed by said center of rotation and the two sewing thread contact members being substantially 120° and the ratio of the distance from said center of rotation to one of the contact members to the distance from said center to the other contact member being between 0.3 and 0.8.

According to this invention, a sewing thread take-up device of the single shaft complex disc type in a sewing machine of the type in which a rotary hook makes two revolutions during a sewing cycle, comprises three discs concentrically mounted on the main shaft of the machine, two pairs of at least two pin-shaped thread contact members, one of said two pairs being fixed between two of said three discs and the other of said two pairs being fixed between another two of said three discs, and three guides set in adjacent the edges of said discs, said sewing thread being so arranged that it is thrown contrary to a direction of running of said thread by at least any respective one of both pairs of said contact members whenever said thread is running in said direction, by means of extending said thread from one of said three guides to another one of said three guides through a path arranged between the first-named two discs and subsequently from said second-named guide to the third guide through another path arranged between the second-named two discs so that the extending direction is always contrary to the direction of rotation of said discs, thereby said sewing thread is drawn towards said first-named guide continuously.

The sewing thread extends through a thread taking path X and then through a thread charging path Y, said thread taking path X extending from the thread taking guide A to the thread turning guide B under at least one of the two thread taking contact members P and Q, and said thread charging path Y extending from said thread turning guide B to the thread charging guide D over at least one of the two thread charging contact members R and S. Furthermore, directions of said extensions are always contrary to directions of revolutions of said contact members P, Q, R, and S around the center of rotation of said discs so as to put the thread taking path X always cross the thread charging path Y whereby such a cycle of motion is given to a running thread by the revolving motions of the contact members carried by said rotating discs that a cloth being sewn is tightened substantially continuously and constantly.

Furthermore, the present inventors found that the paths X and Y of the running thread should be as follows: Two angles $\angle PCQ$ and $\angle RCS$ placed between said contact members P and Q, and R and S at the center C of rotation of the disc extend from 90° to 140°, respectively; two angles $\angle ACB$ and $\angle DCB$ placed between said three guides A and B, and D and B at the center C of the disc extend from 90° to 140°, respectively, ratios of distances $\overline{CQ}/\overline{CP}$ and $\overline{CS}/\overline{CR}$ are to be from 0.3 to 0.8, respectively; and, preferably, the charging path Y extending from the thread turning guide B to the charging guide D has its longest situation by the action of the contact member S which is fixed nearer than the other contact member R to the center C of rotation of the disc, when the needle rod is in the lowest position substantially.

We understood that there was an idea of crossing a path X with the other Y of a double path always by means of providing a thread-turning guide in a single shaft complex disc type rotary thread take-up device as disclosed in the specification of U.S. Patent No. 1,549,081 (invented by Richard K. Hohmann). It is impossible, however, to charge and discharge a sewing thread properly correlating to a shuttle in a sewing machine rotating at a high speed required as far as said patent concerns, ending in to be impossible to use said patent practically. Furthermore, it is not expected, of course, to have effects such as those of this invention.

According to the Hohmann's patent, as there is only a contact member to act for taking up a thread in the path X, the thread does not contact with the contact member or the member does not act for taking up the thread, during an appreciable long period within a cycle. Therefore, the thread is taken up intermittently so that it becomes difficult to sew with a fine stitch. At the same time, there is not such an effect as the present invention attains, which consists in to collect all vibrations in the thread towards a regulator.

As to the path Y, there is a too small central angle placed between two contact members which take up the thread ending in to produce a poor performance for the take-up action. Practically speaking, there is not found such an action that the thread is thrown in a single direction always. In view of this also, a good sewing is not expected by the Hohmann's invention. There is not found such an effect as to collect all vibrations in the thread towards the regulator.

Notwithstanding the crossing paths X and Y disclosed by the Hohmann's patent, as the same lacks such an substantial construction as the present invention discloses and is considered to be impracticable, it is apparent that the Hohmann's invention is foreign to this invention completely.

In the drawings:

FIGURES 1*a* and 1*b* are a front and a side elevational view of the head of a sewing machine comprising a single shaft complex disc type rotary thread take-up device, respectively;

FIGURES 2*a* through 2*g* are diagrams referring to the relation among situations of the take-up device, the needle rod, and the shuttle during a sewing cycle;

Figure 6:
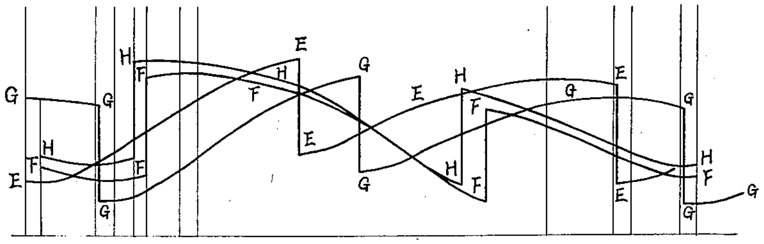

FIGURES 5*a* through 5*g* are explanatory diagrams showing a double shaft complex disc type device for reference corresponding to FIGURES 2*a* through 2*g*, respectively; and FIGURES 6 are diagrams showing a variation in distance between the thread guides and the thread contact members.

Similar parts are indicated by similar numerals and or symbols throughout the several drawings.

Referring to drawings a preferred embodiment of this invention now will be explained.

Figure 1B:
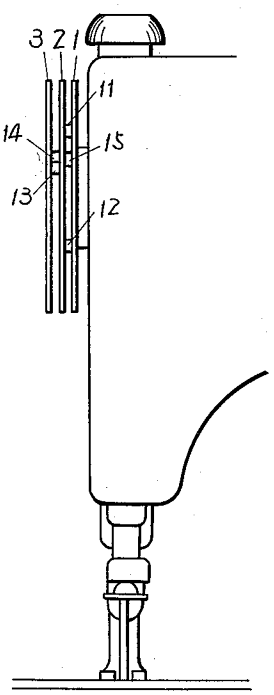
Figure 1A:
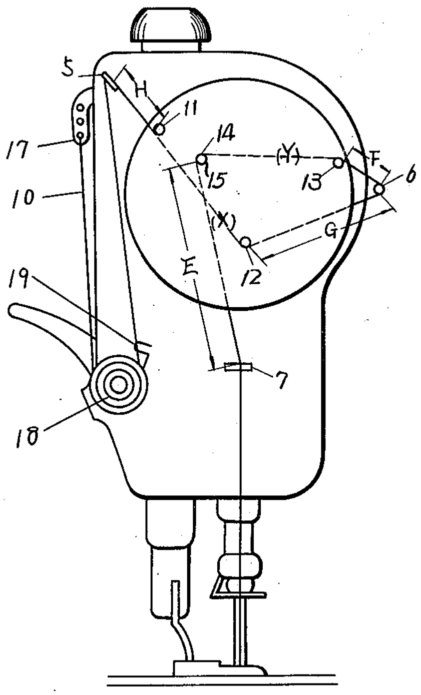

There are three discs 1, 2, and 3 as shown in FIGURES 1*a* and 1*b*. Two pin-shaped sewing thread contact members 11 and 12 are fixed between the right disc 1 and the central disc 2, centers of said contact members 11 and 12 being named P and Q, respectively. Two pin-shaped sewing thread contact members 13 and 14 are fixed between the central disc 2 and the left disc 3, centers of said contact members 13 and 14 being named R and S, respectively. Positions of the thread taking guide 5, the thread turning guide 6, and the thread charging guide 7 are named A, B, and C, respectively. The discs 1, 2, and 3 have a common center C. Lengths of $\overline{CP}$, $\overline{CQ}$, $\overline{CR}$, and $\overline{CS}$ are named $r_1$, $r_2$, $r_3$, and $r_4$, respectively. Angles $\angle PCQ$, $\angle QCR$, $\angle RCS$, $\angle RCP$, $\angle SCQ$, $\angle BCA$, and $\angle DCB$ are named $\theta$, $\beta$, $\delta$, $\varphi$, $\omega$, $\alpha_1$, and $\alpha_2$, respectively.

Now the above parts are positioned conditional on:

$$r_1 = r_3 = 39.5 \text{ mm.}$$
$$r_2 = r_4 = 23.5 \text{ mm.}$$
$$\theta = \omega = 130.5^\circ$$
$$\beta = 101^\circ$$
$$\varphi = \delta = 128.5^\circ$$
$$\alpha_1 = 140^\circ$$
$$\alpha_2 = 90^\circ$$

Furthermore, B is arranged horizontally in alignment with the center of rotation C. D is arranged vertically in alignment with the center C. The distance between D and C is 70 mm. The vertical and horizontal components of the distance between A and C are 45 mm. and 50 mm., respectively.

Figure 2A:
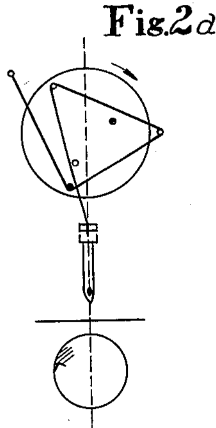
Figure 2B:
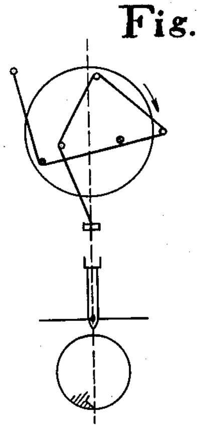
Figure 2C:
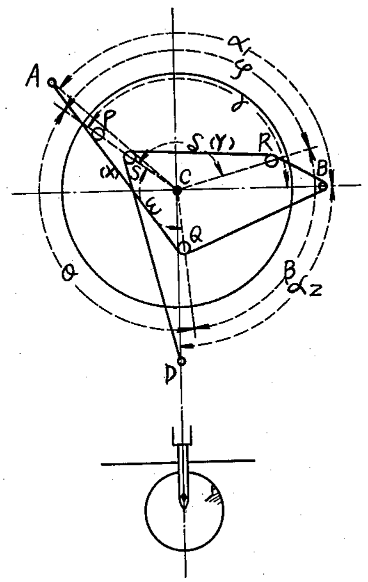
Figure 2D:
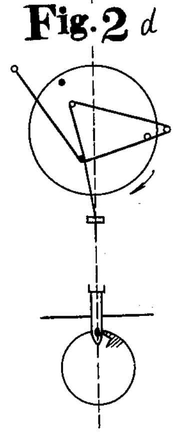
Figure 2E:
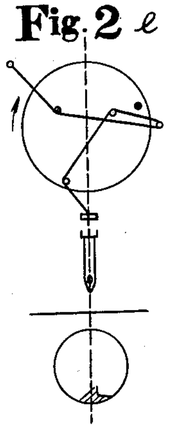
Figure 2F:
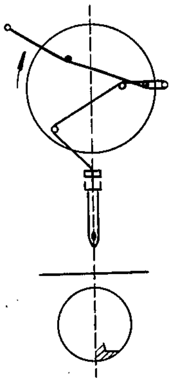
Figure 2G:
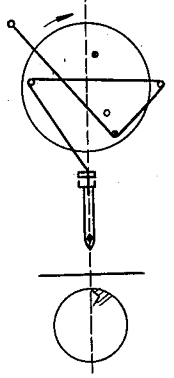

As shown in FIGURE 2*c* showing the phase of the motion of the take-up device where the needle rod is in the lowest position, the left nearer contact member 14 is positioned conditional on:

$$\gamma = 144^\circ$$

where $\gamma$ is the angle $\angle BCS$ placed between the center S of the contact member 14 and the center B of the thread turning guide 6 at the center C of the rotation of the discs.

Furthermore, according to this invention, relations of $r_1$ to $r_2$, $r_3$ to $r_4$, $\alpha_1$ to $\alpha_2$, and $\theta$ to $\delta$ are as follows:

$$90^\circ < (\theta + \delta)/2 \quad \text{(A)}$$
$$0.3 < r_2/r_1 < 0.8 \quad \text{(B)}$$

$$0.3 < r_4/r_3 < 0.8 \quad \text{(C)}$$
$$90^\circ < \alpha_1 < 140^\circ \quad \text{(D)}$$
$$90^\circ < \alpha_2 < 140^\circ \quad \text{(E)}$$
$$90^\circ < \theta < 140^\circ \quad \text{(F)}$$
$$90^\circ < \delta < 140^\circ \quad \text{(G)}$$

That is to say, in order to keep such an effect as slow loosening and quick tensioning of the sewing thread in a single shaft complex disc type rotary thread take-up device, which is very advantageous for sewing with a sewing machine, it is necessary to satisfy the condition disclosed by us in said U.S. Patent No. 2,746,409 as to said relations of $r_1$ to $r_2$, $r_3$ to $r_4$, $\alpha_1$ to $\alpha_2$, and $\theta$ to $\delta$. These conditions, (A), (B), (C), (D), (E), (F), and (G), in a single shaft type take-up device being nothing but the whole scope of the gist of the U.S. Patent No. 2,746,409, one must utilize the right of the patents for carrying out the present invention. Practically speaking with respect to the above effect of slow loosening and quick tensioning, the same effect may be attained with the above-mentioned U.S. Patent No. 2,746,409 when $$0.3 < (r_2/r_1 + r_4/r_3)/2 < 0.8$$
$$90^\circ < (\alpha_1 + \alpha_2)/2 < 140^\circ$$
$$90^\circ < (\theta + \delta)/2 < 140^\circ$$

In addition, the nearer charging contact member S is so positioned that the distance of the path Y of the running thread from the thread turning guide B to the thread charging guide D over the charging contact members R and S is made substantially longest among distances of the path Y by virtue of said position of the nearer charging contact member S when the needle rod is in the lowest position, as shown in FIGURE 2*c* and the phase *c* of FIGURE 3A.

Figure 3:
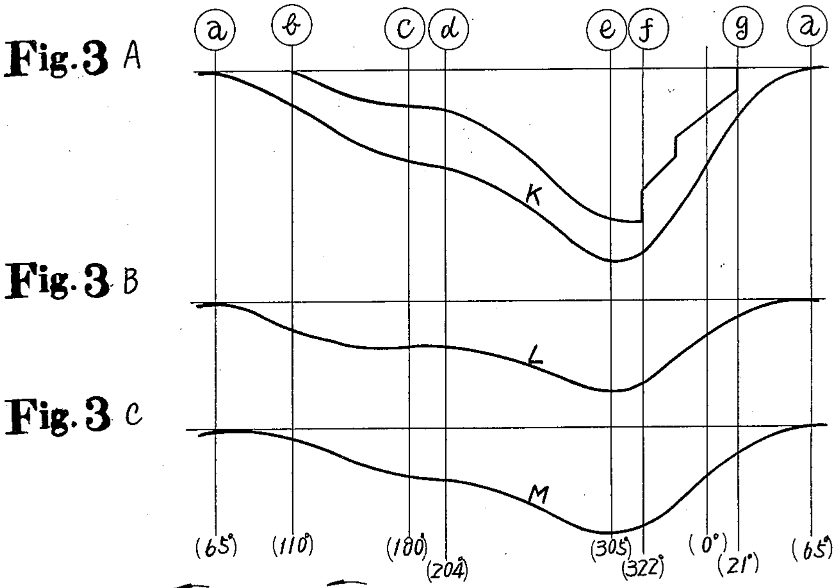
FIGURE 3A is a diagram illustrating variations in the composed take-up of a sewing thread and the charging amount thereof beyond the needle plate.
FIGURES 3B and 3C are diagrams illustrating variations in individual take-ups of a sewing thread effected by the taking and charging contact members, respectively.
Figure 5A:
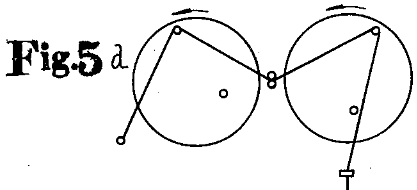
Figure 5E:
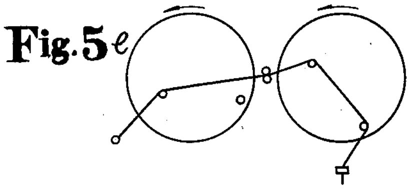
Figure 5B:
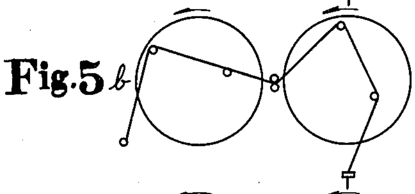
Figure 5F:
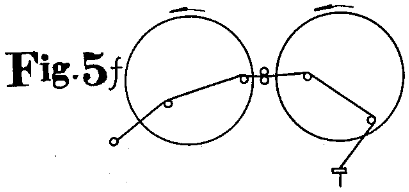
Figure 5C:
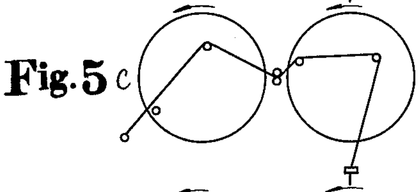
Figure 5G:
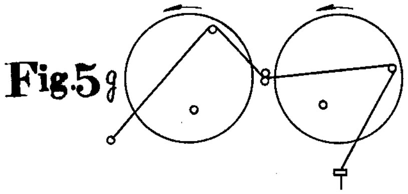
Figure 5D:
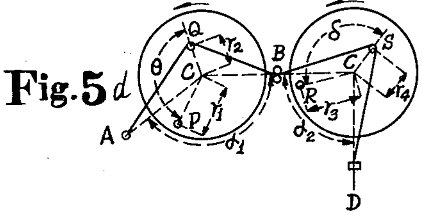

In FIGURES 2, 3, and 5, symbols *a*, *b*, *c*, *d*, *e*, *f*, and *g* indicate the following phases:

(*a*) Highest position of the take-up device;
(*b*) Start of lowering of the eye of the needle;
(*c*) Lowest position of the needle rod;
(*d*) Thread hanging;
(*e*) Lowest position of the take-up device;
(*f*) Thread detachment;
(*g*) Thread leaving off.

A thread 10 coming from a suitable supply passes through a guide 17 and a thread tension regulator 18. The thread then passes through a take-up spring 19 to the taking guide 5(A), and then passes under the thread taking contact member 11(P), and 12(Q), to a thread turning guide 6(B), from whence it returns over the thread charging contact members 13(R), and 14(S), and passes through the charging guide 7(D), to the eye of the needle. Thus the thread runs a double path comprising a taking path X and a charging path Y connected with the former at the thread turning guide B. The taking path X locates between the right disc 1 and the central disc 2. The charging path Y locates between the central disc 2 and the left disc 3. Furthermore, the taking path X locates substantially under the center C of rotation of the discs and the charging path Y locates substantially above the center C. The thread 10 runs in the direction contrary to the revolving direction of the taking contact members P and Q below or under them through the taking path X while in the direction contrary to the revolving direction of the charging contact members R and S over and above them through the charging path Y, said taking path X being thus put across the charging path Y always. By virtue of this arrangement, when the set of discs 1, 2, and 3 rotates some of the contact members P, Q, R, and S tighten continuously the cloth being sewn through the thread 10.

In the conditions indicated by the Formulae (A), (B), (C), (D), (E), (F), and (G) with respect to the relative arrangement of the four contact members P, Q, R, and S and shown in FIGURE 1*a*, the central angle $\theta$ of the taking contact members P and Q is made larger than the central angle $\delta$ of the charging contact members R and S by a matter of 20°. Then, preferably, a third taking contact member 15 may be provided at a point between the discs 1$a$ and 2. Said point may be such that, when the remoter taking contact member P and the nearer charging contact member S are in radial alignment with the center C, the nearer charging contact member S would be in horizontal alignment with the said point. Thus this third taking contact member 15 does never influence the characteristics of the thread charging curve, at least, disadvantageously, which will be explained hereinafter and shown in FIGURES 3B and 3C.

FIGURES 3B and 3C show variations in the thread charging curves L and M in accordance with the revolutions of the two pairs of the contact members P and Q, and R and S. FIGURE 3A shows variation in the thread charging curve K which is composed of the curves L and M. The curve K is so composed of by virtue of a phase lag given between the motions of the two pairs of contact members, the taking contact members and the charging contact members. In the arrangement shown in the drawings, the extent of the central angle $\theta$ of the taking contact members is larger than that of the central angle $\delta$ of the charging contact members. Therefore, the two curves L and M in accordance with the actions of the two pairs of the contact members P and Q, and R and S are not identical with each other. The phase lag is so selected that an ideal composed curve K may be obtained. Then the practical relative arrangement of the taking contact members P and Q to the charging contact members R and S is designed.

In FIGURES 5 a double shaft simple disc type rotary thread take-up device is shown for reference which may act identical to that shown in FIGURE 2, FIGURES 5$a$ through 5$g$ corresponding to FIGURES 2$a$ through 2$g$. In FIGURES 5, the discs are expanded together with the paths of the sewing thread, the direction of rotation of a disc being illustrated the same to the other disc. By these diagrams, it may be seen that the running thread is thrown always into the direction contrary to said running of the thread by means of the revolutions of the four contact members P and Q, and R and S.

FIGURES 6 show variations in distances E, F, G, and H from three thread guides to a nearest contact member among the four contact members, said nearest member engaging with the thread in accordance with the rotation of the take-up device.

It may be easily seen, by these diagrams, that the taking contact members P and Q advance in a direction to approach to the thread taking guide A and to recede from the thread turning guide B except a certain short period, and the charging contact members R and S advance in a direction to approach to the thread turning guide B and to recede from the thread charging guide D except a certain short period. Furthermore, during said short periods, the distances between the contact members and the corresponding guides vary extremely slightly, respectively, so that the action of the corresponding contact member may be seen negligible.

The third charging contact member 15 referred to hereinbefore is located in radial alignment with the remoter taking contact member P and the center C of the rotation of the disc and at the same distance with the nearer charging contact member S from the center C of the rotation of the disc. It is preferable to arrange the third charging contact member 15 as above for modifying the thread charging curve.

Figure 4:
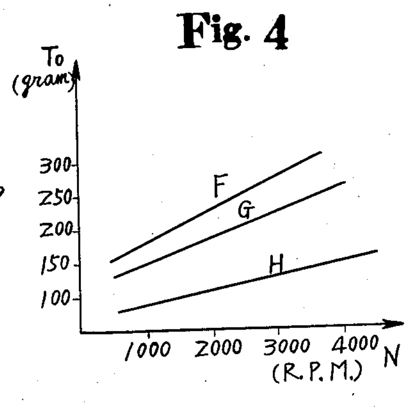
FIGURE 4 shows a comparison in the tensioning characteristics between this invention and others.

According to the construction of this embodiment as above, tensions are given to the sewing thread 10 in substantially same directions with each other with respect to the three thread guides A, B, and D by the corresponding three of the four contact members P, Q, R, and S, which are connected with the three guides directly through the thread 10, respectively. That is to say, the taking contact members P and Q advance in the direction for approaching to the guide A and for receding from the guide B while the charging contact members R and S advance in the direction for receding from the guide B and for approaching to the guide D so as to throw the running thread in a direction towards the tension regulator 18 by virtue of the centrifugal force given to the running thread by the revolutions of the contact members and the frictions between the contact members and the thread (see FIGURES 5). Accordingly the tension of the thread is given always in the direction towards the tension regulator 18 so as to diminish the tension of the thread at the regulator 18 remarkably, referring to FIGURE 4 wherein the abscissa N indicates the r.p.m. of the take-up device, the ordinate $T_0$ indicates the tension in grams to the running thread at the proximity of the tension regulator 18, the curves F and G indicate tensions in sewing machines according to prior art, and the curve H indicates the corresponding tension in the sewing machine according to this invention.

By virtue of this construction of this invention, it becomes capable of sewing easily with a weak thread or an extensible thread such as nylon using a sewing machine rotating at 4000–5000 r./m.

In addition, the vibration of the running thread produced by the take-up device rotating at such a high speed as above advances towards the tension regulator so as to be absorbed by the thread takeup spring 19, etc. Therefore, no vibration of the running thread may be found in the proximity of the eye of the needle rod so that the afore-mentioned effects may be attained.

While there is herein shown and described a preferred embodiment of the present invention, we do not wish to be limited to the embodiment herein particularly shown and specifically described, but rather intend that the invention shall include all reasonable equivalents thereof which will occur to those skilled in the art from the present disclosure.

We claim:

1. A sewing thread take-up device of the single shaft complex disc type in a sewing machine of the type in which a rotary hook makes two revolutions during a sewing cycle, comprising three discs concentrically mounted on the main shaft of the machine, two pairs of at least two pin-shaped thread contact members, one of said two pairs being fixed between two of said three discs, and the other of said two pairs being fixed between another two of said discs, and three guides set in adjacent the edge of said discs, each guide being at a different distance from the center of said discs, and one pin shaped contact member of each pair being on the same radius as one pin shaped contact member of the other pair, a sewing thread adapted to be so arranged that it is thrown contrary to a direction of running of said thread by at least one of said pairs of said contact members whenever said thread is running in said direction, by means of extending the thread from one of said three guides to another one of said three guides through a path arranged between the first-named two discs and subsequently from said second-named guide to the third guide through another path arranged between the second-named two discs so that the extending direction is always contrary to the direction of rotation of said discs, whereby the sewing thread is adapted to be drawn towards said first-named guide continuously, said thread contact members being arranged conditional on:

$$0.3<(r_2/r_1+r_4/r_3)/2<0.8$$

$$90°<(\alpha_1+\alpha_2)/2<140°$$

and $$90°<(\theta+\delta)/2<140°$$

where $r_1$, $r_2$, $r_3$, and $r_4$ are distances from the center of rotation of said discs to each of the two contacts of said two pairs of contact members, $\alpha_1$ is the central angle placed between said first-named guide and said second-named guide, $\alpha_2$ is the central angle placed between said second-named guide and said third guide, $\theta$ is the central angle placed between said first-named pair of contact members, and $\delta$ is the central angle placed between said second-named pair of contact members.

2. A sewing thread take-up device of the single shaft complex disc type in a sewing machine of the type in which a rotary hook makes two revolutions during a sewing cycle, comprising three discs concentrically mounted on main shaft of the machine, at least two pin-shaped sewing thread taking contact members fixed between two of said three discs, one of said taking contact members being arranged remoter than the other from the center of said disc, at least two pin-shaped sewing thread charging contact members fixed between another two of said three discs, one of said thread taking contact members and one of said thread charging contact members being on the same radius, one of said charging contact members being arranged remoter than the other from the center of said disc, a stationary sewing thread taking guide set in adjacent the upper half edge of said disc, a stationary sewing thread turning guide set in adjacent the edge of and in horizontal alignment with the center of said disc, and a stationary sewing thread charging guide set in adjacent the edge of and in vertical alignment with the center of said disc, the angle placed between said thread taking guide and said thread turning guide at said center and the angle placed between said remoter thread contact members at said center extending substantially 120°, respectively, and ratio of the distance from said center to either of said nearer contact members to the distance from said center to either of said remoter contact members being between 0.3 and 0.8, characterized in that a sewing thread is adapted to be extended from said thread taking guide to said thread charging guide through said thread turning guide always in direction contrary to the rotation of said discs so that a cloth being sewn is tightened continuously by the sewing thread, wherein said discs are driven in the clockwise direction and the sewing thread extends from said thread taking guide to said thread turning guide through a rightward taking path arranged substantially always below the center of the disc and from said thread turning guide to said thread charging guide through a leftward charging path arranged substantially always above the center of the disc so as to throw said sewing thread continuously in the direction for approaching said thread taking guide by the action of any of said contact members arranged inside said paths so as to tighten continuously the cloth being sewn.

3. A sewing thread take-up device as claimed in claim 2, wherein said discs are driven in the clockwise direction and a sewing thread adapted to extend from said thread taking guide to said thread turning guide through a rightward taking path arranged under said thread taking contact members and from said thread turning guide to said thread charging guide through a leftward charging path arranged over said thread charging contact members, said thread taking path being put across said thread charging path so that the sewing thread is adapted to be thrown continuously in the direction for approaching said thread taking guide by the action of any of said contact members so as to tighten continuously the cloth being sewn.

4. A sewing thread take-up device as claimed in claim 2, wherein said remoter thread taking contact member is arranged in radial alignment with said rearer thread charging contact member and said center while said remoter thread charging contact member is arranged out of radial alignment with said nearer thread taking contact member and said center.

5. A sewing thread take-up device as claimed in claim 4, wherein a negative central angle placed between said remoter thread taking contact member and said nearer thread taking contact member, said angle being negative relative to the radius line between said remoter thread taking member and said rearer thread charging contact member, is larger than a positive angle placed between said nearer thread charging contact member and said remoter thread charging contact member, said last-mentioned angle being positive relative to said radius line said discs being driven positively.

6. A sewing thread take-up device as claimed in claim 5, wherein a negative central angle extending from 90° to 140° relative to the radius line between said remoter thread taking contact member and said rearer thread charging contact member, is placed between said remoter thread taking contact member and said nearer thread taking contact member and a positive central angle extending from 90° to 140° relative to said radius line, is placed between said nearer thread charging contact member and said remoter thread charging contact member, said negative angle being larger than said positive angle, said discs being driven positively.

7. In a sewing machine having a main shaft, an operative needle and a thread tension regulator, a thread control device comprising three disks separated to provide inner and outer spaces and rotating with and in the same direction and in synchronism with said shaft, three fixed thread guides disposed exteriorly of said disks, the three angles between the center of said disks and the three fixed guides being substantially equal, a pair of thread-contacting pins within each of said inner and outer spaces respectively and connected to said disks, the angle at the center of said disks formed by said contact pins within the inner component being between 120° and 160°, the ratio of radius of rotation of the pins within the inner space being between 0.8 and 1.0, the disposition of the pins in the outer component involving an angle of less than 90° and the ratio being between 0.3 and 0.8, whereby an excessive slackness created in the outer space during the loop-forming period of the sewing cycle will be taken up by the pins in the inner space.

8. In a sewing machine having a main shaft, an operative needle and a thread tension regulator, a thread control device comprising three disks separated to provide inner and outer spaces and rotating with and in the same direction and in synchronism with said shaft, three fixed thread guides disposed exteriorly of said disks, each of the three angles between the center of said disks and the three fixed guides being at least 90° and not more than 140°, a pair of thread-contacting pins within each of said inner and outer spaces respectively and connected to said disks, the angle at the center of said disks formed by said contact pins within the inner component being between 120° and 160°, the ratio of radius of rotation of the pins within the inner space being of the order of 0.8, the disposition of the pins in the outer component involving an angle of the order of 90° and the ratio being between 0.3 and 0.8, whereby an excessive slackness created in the outer space during the loop-forming period of the sewing cycle will be taken up by the pins in the inner space.

References Cited in the file of this patent

UNITED STATES PATENTS 2,386,678 Backlin ---------------- Oct. 9, 1945

FOREIGN PATENTS 190,736 Germany -------------- Oct. 31, 1907
500,130 Italy ------------------ Nov. 17, 1954